Patented Oct. 22, 1935

2,017,877

UNITED STATES PATENT OFFICE 2,017,877

PHENOLIC RESINOUS PRODUCTS AND COMPOSITIONS CONTAINING THEM

Victor H. Turkington, Caldwell, and William Henry Butler, Arlington, N. J., assignors to Bakelite Corporation, New York, N. Y., a corporation of Delaware No Drawing. Application January 29, 1929,
Serial No. 336,007

6 Claims. (Cl. 260—4)

This invention relates to synthetic phenolic resinous products and comprises such products that are found to have the highly useful property of being compatible with fatty oils, such as tung oil, linseed oil, rapeseed oil, castor oil and similar oils, including as well varnishes and other coating compositions prepared therefrom to yield coatings that are characterized by toughness, flexibility, adhesiveness and durability.

The commonly known resinous products obtained in the condensation of phenol or cresol with formaldehyde or equivalent methylene-containing agents have the properties of durability and resistance to water, acids and other corrosive or destructive influences which make them desirable for coating compositions; but they are not suitable as such for coating compositions on account of their hardness and brittleness, and furthermore they are known to be insoluble in fatty oils. It has been proposed to make them soluble in or miscible with fatty oils by fusing them with rosin, but the presence of rosin detracts from the desirable properties of phenolic resinous products in proportion to the relative amount present.

We have discovered that the degree of solubility of miscibility of phenolic resinous products in fatty oils depends largely on the phenolic body used in their preparation. Products obtained from phenolic bodies containing two or more benzene rings are characterized by a ready solubility or miscibility with fatty oils without the addition of a solubilizing agent or other treatment; for example, multiple ring phenolic bodies found suitable for the manufacture of oil varnishes include aryl-substituted phenols such as para-hydroxy-diphenyl, ortho-hydroxy-diphenyl, dicresols, dithymols.

Hydroxydiphenyl resinous products are particularly desirable for use with fatty oils in coating compositions on account of their excellent resistance to water and their stability or permanence of color while under the influence of light and oxidation; they are thus distinguished from many other phenolic resinous products which darken upon exposure to light and air. The para-hydroxydiphenyl resinous products particularly are further characterized by hardness and high·melting points and therefore advantageous for coatings exposed to high temperatures; for example, their high melting points and their resistance to moisture make them desirable in coatings for furniture and the like that must withstand hot and humid atmospheric conditions and remain free from tackiness or "printing". These resinous products are further distinguished from the commonly known phenol and cresol resinous products in that they are not as readily polymerized to insoluble, infusible bodies by heating; they may be subjected to heat at temperatures as high as 200° C. and remain fusible and soluble even when the usual excess of methylene-containing agents is employed in the condensation. This tendency on the part of hydroxydiphenyl resinous products to remain unpolymerized when heated is advantageous in cooking with fatty oils to produce oil varnishes, for they do not separate out of solution or cause jelling of the entire mass as is the case with the usual phenol and cresol resinous products.

In the manufacture of oil varnishes from the resinous bodies to which this invention is directed, the methods and proportions generally used may be followed. The resinous product is dissolved in a fatty oil by heating and the heating continued until the desired viscosity or "body" is obtained. Or the condensation of the phenolic body with a methylene-containing agent can be carried out in the presence of a fatty oil, the water removed and the mass thickened to the desired viscosity. Suitable solvents, such as petroleum thinner, turpentine and other solvents commonly used in varnish, and driers if desired, are then added and after cooling the varnish so formed is ready for use. Varnishes prepared in this manner are fast in drying (about 20 minutes with customary solvents) to a non-tacky condition; this property in conjunction with the properties of flexibility, toughness, adhesiveness and resistance to weather conditions inherent in them peculiarly adapt them for coating leather, fabrics, etc., used for autotops and similar products, and for all outdoor purposes.

The following examples are given to illustrate the invention, but it is to be understood that the proportions and ingredients are not limited to those specifically mentioned. All parts are by weight.

*Example 1.*—100 parts of para-hydroxydiphenyl and 100 parts of commercial formaldehyde, either with or without acid or alkaline condensing agents, are heated in a closed container under pressure to a temperature of about 120° C. or more until the condensation is substantially complete. The water is then removed by heating at atmospheric or reduced pressure. The product obtained by this procedure is a hard, clear, light colored resinous material, melting at about 150° C. or higher and is readily soluble in tung oil and other fatty oils.

Ortho-hydroxydiphenyl can be substituted for the para-hydroxydiphenyl to yield hard clear light amber colored materials which melt at about 80° C. Or the two can be mixed in varying proportions to give resinous products having any desired melting point ranging from 80° C. and upward.

*Example 2.*—100 parts of para-hydroxydiphenyl and 25 parts of hexamethylenetetramine are heated together in an open vessel or in a vessel provided with a reflux condenser. The ingredients fuse at about 130° C. and react with evolution of ammonia. As the reaction proceeds, the melting point of the mass increases and very hard, high-melting products are obtained if the heating is continued to 200° C. or above, which products remain soluble in fatty oils. As in the above example, ortho-hydroxy-diphenyl may be substituted in whole or in part or the commercially available mixtures can be used to yield oil-soluble products of varying melting point.

*Example 3.*—100 parts parahydroxydiphenyl, 100 parts commercial formaldehyde and 100 parts tung oil, with or without acid or alkaline condensing agent, are heated together in a closed vessel under pressure to about 120° C. and maintained at that temperature until condensation is substantially complete. Water is thereupon removed by heating at atmospheric or reduced pressure and the mass is further heated up to a temperature of about 200° C. until the desired consistency is reached. Metallic driers may be included if desired. When the product is dissolved in suitable solvents, a varnish is obtained that is characterized by rapid drying and excellent resistance to weathering, moisture and other destructive influences. Ortho-hydroxy-diphenyl or its admixtures with para-hydroxydiphenyl can be similarly treated.

*Example 4.*—100 parts of a hydroxy-diphenyl, 90 parts of furfural and 1 part sodium carbonate are heated together under a reflux condenser to the desired consistency. This product is soluble in fatty oils and suitable for preparing dark colored varnishes.

*Example 5.*—100 parts of a hydroxy-diphenyl, 100 parts acetaldehyde and 1 part commercial hydrochloric acid are refluxed together. The mass is dehydrated to yield an oil-soluble product.

The examples given describe synthetic resinous products prepared from phenolic bodies of higher molecular weight without admixtures; but other resinous materials, such as natural resins or novolaks, can be included either by addition to the raw ingredients or by incorporation with the finished reaction product. Among the natural resins found suitable may be mentioned rosin or colophony, copals, elemi, mastic, etc. Such additions of natural resins are mainly useful in reducing the cost of the product, but otherwise are generally undesirable as they lower the quality, greatly reduce the resistance to weathering and increase the drying time.

We claim:

1. A composition of matter comprising a resinous reaction product of a hydroxydiphenyl and formaldehyde.

2. A composition of matter comprising a resinous reaction product of a mixture of para- and ortho-hydroxydiphenyl with a methylene-containing agent.

3. A composition of matter comprising a resinous reaction product of para-hydroxydiphenyl and formaldehyde.

4. A composition of matter comprising a resinous reaction product obtained by heating substantially equal parts by weight of para-hydroxydiphenyl and commercial formaldehyde to the point of substantially complete condensation and subsequent removal of water.

5. Composition of matter comprising a resinous reaction product of a methylene-containing agent and a hydroxydiphenyl.

6. Composition of matter comprising a reaction product of a methylene-containing agent and a phenol substituted by a single phenyl radicle.

VICTOR H. TURKINGTON.
WILLIAM HENRY BUTLER.